United States Patent
Umetsu

(10) Patent No.: US 8,498,745 B2
(45) Date of Patent: Jul. 30, 2013

(54) ROBOT APPARATUS AND GRIPPING METHOD FOR USE IN ROBOT APPARATUS

(75) Inventor: Mayumi Umetsu, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 170 days.

(21) Appl. No.: 13/175,933

(22) Filed: Jul. 4, 2011

(65) Prior Publication Data

US 2012/0004774 A1   Jan. 5, 2012

(30) Foreign Application Priority Data

Jul. 5, 2010   (JP) ................ 2010-152765

(51) Int. Cl.
  *B25J 13/08*   (2006.01)
  *B25J 5/00*   (2006.01)

(52) U.S. Cl.
  USPC ........... 700/254; 901/34; 901/46; 901/2; 901/9; 901/1; 318/568.16

(58) Field of Classification Search
  None
  See application file for complete search history.

(56) References Cited

U.S. PATENT DOCUMENTS

| 2004/0078114 A1* | 4/2004 | Cordell et al. ............ 700/258 |
| 2004/0172164 A1* | 9/2004 | Habibi et al. ............ 700/245 |
| 2009/0037033 A1* | 2/2009 | Phillips et al. ............ 701/2 |
| 2009/0302626 A1* | 12/2009 | Dollar et al. ............ 294/106 |
| 2010/0256814 A1* | 10/2010 | Smith ............ 700/259 |
| 2010/0292837 A1* | 11/2010 | Takahashi et al. ............ 700/245 |
| 2011/0067504 A1* | 3/2011 | Koyama et al. ............ 73/862.381 |

FOREIGN PATENT DOCUMENTS

| JP | 2003-094367 | 4/2003 |
| JP | 2005-161507 | 6/2005 |
| WO | WO 2009144767 A1 * | 12/2009 |

OTHER PUBLICATIONS

Mehdian, Mehrdad, "A Sensory Gripper Using Tactile Sensors for Object Recognition, Orientation Control, and Stable Manipulation" IEEE Transactions on Systems, Man, and Cybernetics, vol. 19, No. 5, Sep. 1989, p. 1250-1261.*

* cited by examiner

*Primary Examiner* — Khoi Tran
*Assistant Examiner* — Ryan Rink
(74) *Attorney, Agent, or Firm* — Ditthavong Mori & Steiner, P.C.

(57) ABSTRACT

A robot apparatus includes a robot arm, a multi-fingered hand disposed at an end of the robot arm and including a force sensor for use in force control, an image processor that acquires at least location information on a gripping target by detection made by a visual sensor, and a control device that moves the robot arm on the basis of the at least location information on the gripping target acquired by the image processor to cause the multi-fingered hand to approach the gripping target, detects a contact location of actual contact with the gripping target on the basis of an output of the force sensor of the multi-fingered hand, and modifies the location information on the gripping target on the basis of information indicating the detected contact location.

11 Claims, 7 Drawing Sheets

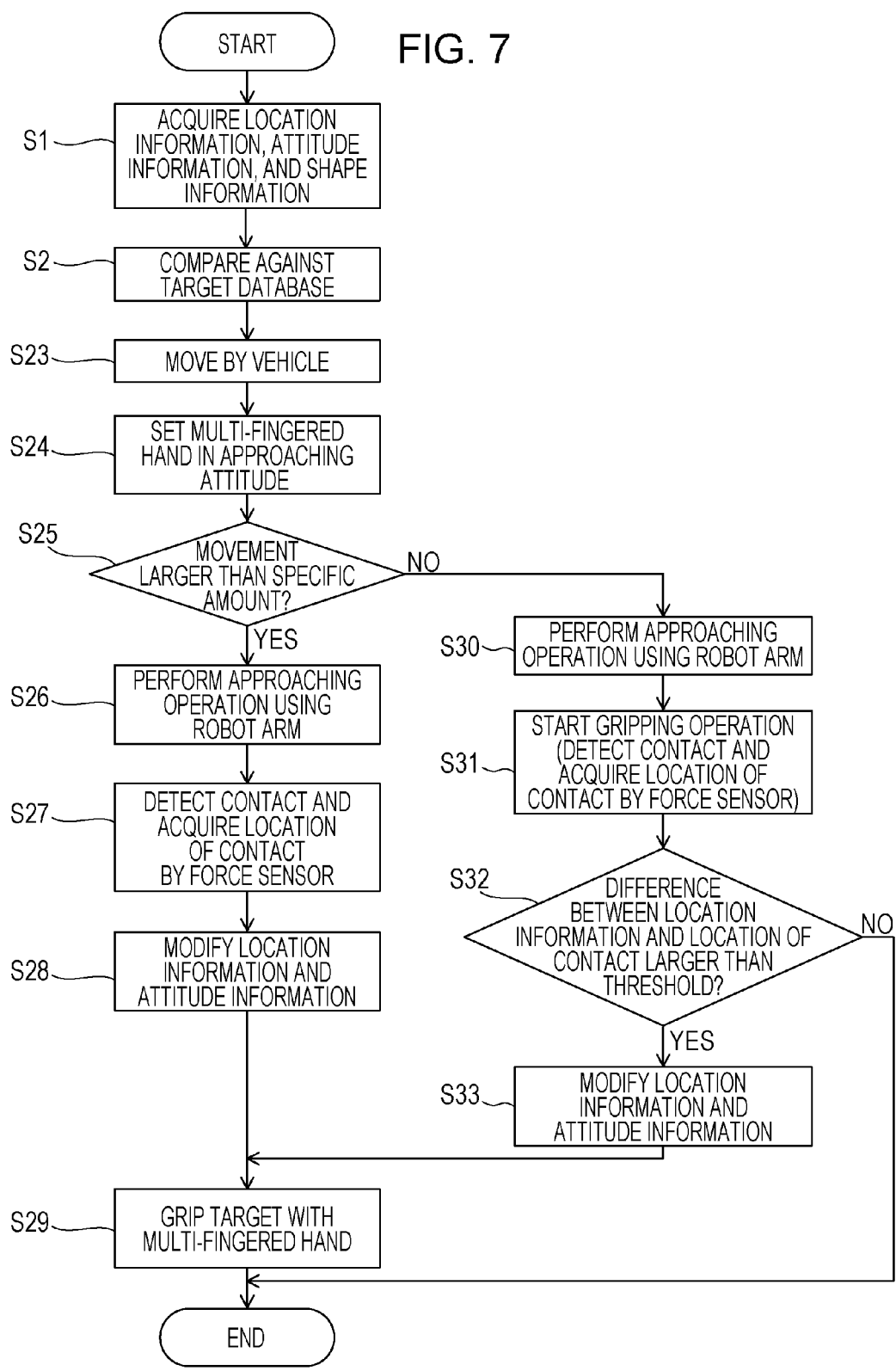

ROBOT APPARATUS AND GRIPPING METHOD FOR USE IN ROBOT APPARATUS

CROSS-REFERENCE TO RELATED APPLICATION

The present application claims priority under 35 U.S.C. §119 to Japanese Patent Application No. 2010-152765 filed Jul. 5, 2010. The contents of this application are incorporated herein by reference in their entirety.

BACKGROUND OF THE INVENTION

1. Field of the Invention

The present invention relates to a robot apparatus and a gripping method for use in a robot apparatus.

2. Description of the Related Art

As examples of a robot apparatus that includes a robot arm and a multi-fingered hand, one that includes a robot arm, a multi-fingered hand at an end of the robot arm, and a camera is disclosed in Japanese Unexamined Patent Application Publication No. 2005-161507 and Japanese Unexamined Patent Application Publication No. 2003-94367.

A robot apparatus that includes a robot arm, a multi-fingered hand at an end of the robot arm, a camera, and a database that stores information indicating the shape of a target is also disclosed.

SUMMARY OF THE INVENTION

According to one aspect of the present invention, a robot apparatus includes a robot arm, a multi-fingered hand, an information acquiring unit, and a controller. The multi-fingered hand is disposed at an end of the robot arm and includes at least one fingertip force sensor for use in force control. The information acquiring unit acquires at least location information on a target by an input from a user or by detection made by a detection unit. The controller moves the robot arm to cause the multi-fingered hand to approach the target on the basis of the at least location information on the target acquired by the information acquiring unit, detects a contact location of actual contact with the target on the basis of an output of the at least one fingertip force sensor of the multi-fingered hand, and modifies the location information on the target on the basis of information indicating the detected contact location.

According to another aspect of the present invention, a gripping method for use in a robot apparatus including a robot arm having an end on which a multi-fingered hand including a fingertip force sensor is disposed includes the steps of acquiring at least location information on a target, moving the robot arm on the basis of the at least acquired location information on the target to cause the multi-fingered hand at the end of the robot arm to approach the target and detecting a contact location of actual contact with the target on the basis of an output of the fingertip force sensor of the multi-fingered hand, and modifying the location information on the target on the basis of information indicating the detected contact location.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 is a flowchart for describing a process executed by the control device when the robot apparatus illustrated in FIG. 5 according to the third embodiment carries out a gripping operation.

DESCRIPTION OF THE EMBODIMENTS

Figure 1:
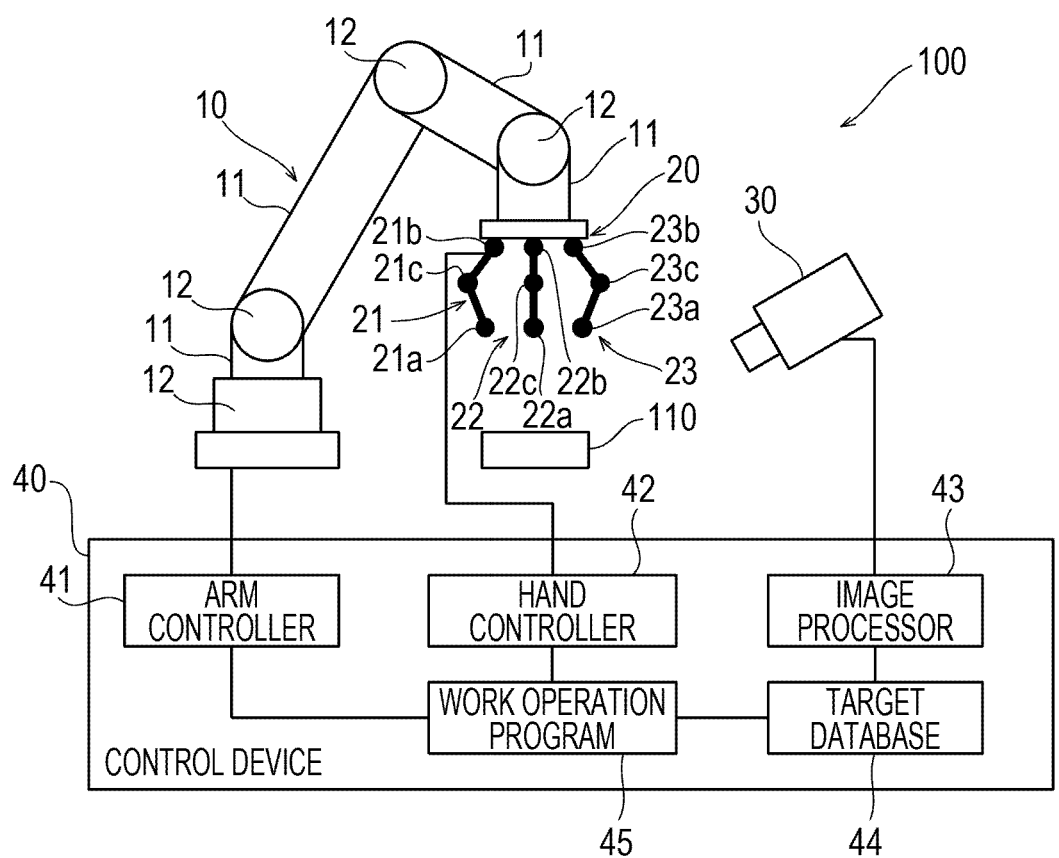
FIG. 1 is a diagram that illustrates a general configuration of a robot apparatus according to a first embodiment.

Embodiments will now be described with reference to the accompanying drawings, wherein like reference numerals designate corresponding or identical elements throughout the various drawings.

A structure of a robot apparatus 100 according to a first embodiment is described below with reference to FIG. 1. The first embodiment illustrates an example in which the present invention is applied to a life support robot used in daily life (environment).

As illustrated in FIG. 1, the robot apparatus 100 according to the first embodiment has the function of gripping and lifting an object (gripping target 110) with a multi-fingered hand 20 attached to end of a robot arm 10 in response to an instruction from a user and moving the object to a designated location.

The robot apparatus 100 includes the robot arm 10, the multi-fingered hand 20 attached to the end of the robot arm 10, a visual sensor 30 for detecting the gripping target 110 and its surroundings, and a control device 40 for controlling an operation of the robot apparatus 100. The visual sensor 30 is an example of a detection unit, and the control device 40 is an example of a controller.

The robot arm 10 includes a plurality of arms (links) 11 and joints 12 for connecting the arms 11. The joints 12 are provided with their respective motors (not illustrated) and drive the arms 11 connected thereto in a specific direction (rotational direction about a joint axis). The robot arm 10 has a configuration that allows action of six degrees of freedom, for example.

The multi-fingered hand 20 is attached to the end of the robot arm 10 and includes three fingers 21, 22, and 23 spaced at substantially equiangular intervals. The three fingers 21, 22, and 23 have substantially the same configuration and include force sensors 21a, 22a, and 23a, respectively, at their ends (fingertips). The fingers 21, 22, and 23 include joints 21b, 22b, and 23b, respectively, adjacent to their bases and also include joints 21c, 22c, and 23c, respectively, at their intermediate locations. The fingers 21, 22, and 23 are driven in their rotational directions about the axes of their joints (21b to 23b and 21c to 23c) by motors (not illustrated) provided at these joints. Therefore, each of the fingers 21, 22, and 23 has two degrees of freedom. Each of the force sensors 21a, 22a, and 23a is an example of a fingertip force sensor.

Each of the force sensors 21a, 22a, and 23a is a pressure sensor for detecting forces in directions of mutually perpendicular three axes. The force sensors 21a, 22a, and 23a detect external forces (loads) applied to the tips of the fingers 21, 22, and 23, respectively. A detection signal of each of the force sensors 21a, 22a, and 23a is output to the control device 40. For the first embodiment, contact between the multi-fingered hand 20 (fingers 21, 22, and 23) and an object (gripping target 110 and another peripheral object, such as a wall or table) can be detected on the basis of an output of each of the force sensors 21a, 22a, and 23a.

The visual sensor 30 is a camera for obtaining an image of the gripping target 110 and its surroundings. Data of an image obtained by the visual sensor 30 is captured by the control device 40.

The control device 40 includes an arm controller 41, a hand controller 42, an image processor 43, and a target database 44. The control device 40 stores a work operation program 45 for controlling an operation of the robot apparatus 100. The image processor 43 is an example of an information acquiring unit.

The arm controller 41 has the function of controlling an operation of each section of the robot arm 10 on the basis of the work operation program 45. Specifically, the arm controller 41 drives the joints 12 of the robot arm 10 on the basis of location information and attitude information on the gripping target 110 acquired by the image processor 43. In an operation of gripping the gripping target 110, the arm controller 41 controls the robot arm 10 so as to carry out an approaching operation to the gripping target 110 (an operation of moving the robot arm 10 to cause the multi-fingered hand 20 to approach the gripping target 110).

The hand controller 42 has the function of controlling an operation of each of the fingers 21 to 23 of the multi-fingered hand 20 on the basis of the work operation program 45. Specifically, the hand controller 42 controls a gripping operation by which a gripping attitude at which the gripping target 110 is gripped and an approaching attitude (an attitude at which the fingers are arranged in adjacent areas (in the vicinity) of the gripping target 110) as the preceding stage of the gripping attitude are taken, by controlling the three fingers 21, 22, and 23 of the multi-fingered hand 20.

In the operation of gripping the gripping target 110, the hand controller 42 can cause the multi-fingered hand 20 (fingers 21, 22, and 23) to come into contact with the gripping target 110 with a force that does not change the location of the gripping target 110 by force control (impedance control) based on the output of each of the force sensors 21a, 22a, and 23a. Specifically, the hand controller 42 sets an impedance model that specifies a relationship between a force and the amount of a displacement using virtual mechanical impedance (inertia coefficient, viscosity coefficient, and stiffness (spring) coefficient) for each of the fingers 21, 22, and 23, converts an output (force information) of each of the force sensors 21a, 22a, and 23a into the amount of a location displacement on the basis of the impedance model in response to an input location instruction to the fingers 21, 22, and 23 and feeds it back, thereby modifying the input location instruction. When this virtual mechanical impedance (inertia coefficient, viscosity coefficient, and stiffness (spring) coefficient) is set to a small value, resistance to external force is small and therefore the force exerted on an object when the multi-fingered hand 20 comes into contact with the object can be small. Accordingly, properly adjusting the value of this mechanical impedance achieves a soft touch in the contact with the gripping target 110, thus allowing the multi-fingered hand 20 to come into contact with the gripping target 110 without changing in the location of the gripping target 110.

The image processor 43 can acquire location information, attitude (orientation) information, shape information on the gripping target 110 by capturing data of an image obtained by the visual sensor 30 and processing the image data. Here, the location information on the gripping target 110 is information that indicates its location of three degrees of freedom in a coordinate system set in the visual sensor 30 (e.g., Cartesian coordinate system of x, y, and z axes). The attitude information on the gripping target 110 is information that indicates its rotational angle location of three degrees of freedom about each axis in a coordinate system set in the visual sensor 30 (e.g., Cartesian coordinate system of x, y, and z axes). When the location information and attitude information is converted from one in the coordinate system for visual sensor 30 to one in the coordinate system for the robot arm 10 and the multi-fingered hand 20, the location information and attitude information on the gripping target 110 in the coordinate system for the robot arm 10 and the multi-fingered hand 20 is obtainable. The shape information on the gripping target 110 is information that indicates, for example, the outline of the gripping target 110 acquired by image processing. This shape information is compared against information stored in the target database 44, thus enabling the gripping target 110 registered in the target database 44 to be identified from the shape contained in the image data (the shape of the gripping target 110).

The target database 44 can register an object that can be a target to be gripped as a gripping target 110 in advance and retains dimensional information on the gripping target 110, gripping manner data that specifies a gripping location for the gripping target 110 to be gripped by the multi-fingered hand 20 (location at which the multi-fingered hand 20 is to grip the gripping target 110) and a gripping attitude (a direction from which and a joint angle at which the multi-fingered hand 20 is to grip the gripping target 110 (e.g., grip the gripping target 110 from its upward direction or from its lateral direction)), or other data. The control device 40 can acquire the dimensional information or other information on the gripping target 110 by comparing the shape information on the gripping target 110 detected by the image processor 43 against information stored in the target database 44.

With the above-described configuration, the control device 40 acquires the location information, attitude information, dimensional information, gripping location, and gripping attitude on the gripping target 110 on the basis of data of an image obtained by the visual sensor 30 and also carries out an operation of gripping the gripping target 110 by driving the robot arm 10 and the multi-fingered hand 20 through the arm controller 41 and the hand controller 42 on the basis of the above information. However, if the location information and attitude information on the gripping target 110 acquired on the basis of image data obtained by the visual sensor 30 contains an error, for example, deviation may occur in the gripping location of gripping by the multi-fingered hand 20 and the gripping attitude (a direction in which the multi-fingered hand 20 grips the gripping target 110).

That is, driving the robot arm 10 and the multi-fingered hand 20 on the basis of the location information and attitude information on the gripping target 110 acquired by the visual sensor 30 needs complete agreement between the coordinate system for the visual sensor 30 (camera coordinate system) and the coordinate system for the robot arm 10 and the multi-fingered hand 20 (coordinate system for the robot apparatus 100). To this end, calibration for bringing both coordinate systems into agreement with each other is carried out in advance. However, the calibration may be insufficient or the positional relationship between the visual sensor 30 and each of the robot arm 10 and the multi-fingered hand 20 may vary. In such cases, an error contained in the location information and attitude information on the gripping target 110 results in deviation in the gripping location of gripping by the multi-fingered hand 20 and the gripping attitude (a direction in which the multi-fingered hand 20 grips the gripping target 110).

For the first embodiment, deviation in the gripping location and the gripping attitude of gripping by the multi-fingered hand 20 is reduced by modification of the location information and attitude information on the gripping target 110 on the basis of information that indicates a contact location of actual contact with the gripping target 110. That is, the control device 40 moves the robot arm 10 to cause the multi-fingered hand 20 to approach the gripping target 110 on the basis of the location information and attitude information on the gripping target 110 acquired by the visual sensor 30 and detects a contact location of actual contact with the gripping target 110 on the basis of the output of each of the force sensors 21a, 22a, and 23a of the multi-fingered hand 20. Specifically, a contact location when the contact with the gripping target 110 is detected by the force sensors (21a, 22a, and 23a) is calculated from a joint angle of the robot arm 10 and a joint angle of the multi-fingered hand 20. The control device 40 has the location correcting function of modifying the location information and attitude information on the gripping target 110 on the basis of information that indicates the detected contact location. For the first embodiment, whether the location correcting function of the control device 40 is to be performed by the control device 40 is selectable by a user.

In performing the location correcting function, as described above, force control (impedance control) based on the output of each of the force sensors 21a, 22a, and 23a executed by the hand controller 42 enables an operation without placing, to the gripping target 110, a force that displaces the location of the gripping target 110 even if the robot arm 10 and the fingers 21, 22, and 23 are driven such that all of the three fingers 21, 22, and 23 of the multi-fingered hand 20 come into contact with the gripping target 110.

Next, a flow of a process executed by the control device 40 when the robot apparatus 100 according to the first embodiment carries out a gripping operation is described with reference to FIG. 2. For the first embodiment, the robot apparatus 100 carries out the gripping operation on the basis of the work operation program 45 of the control device 40.

Figure 2:
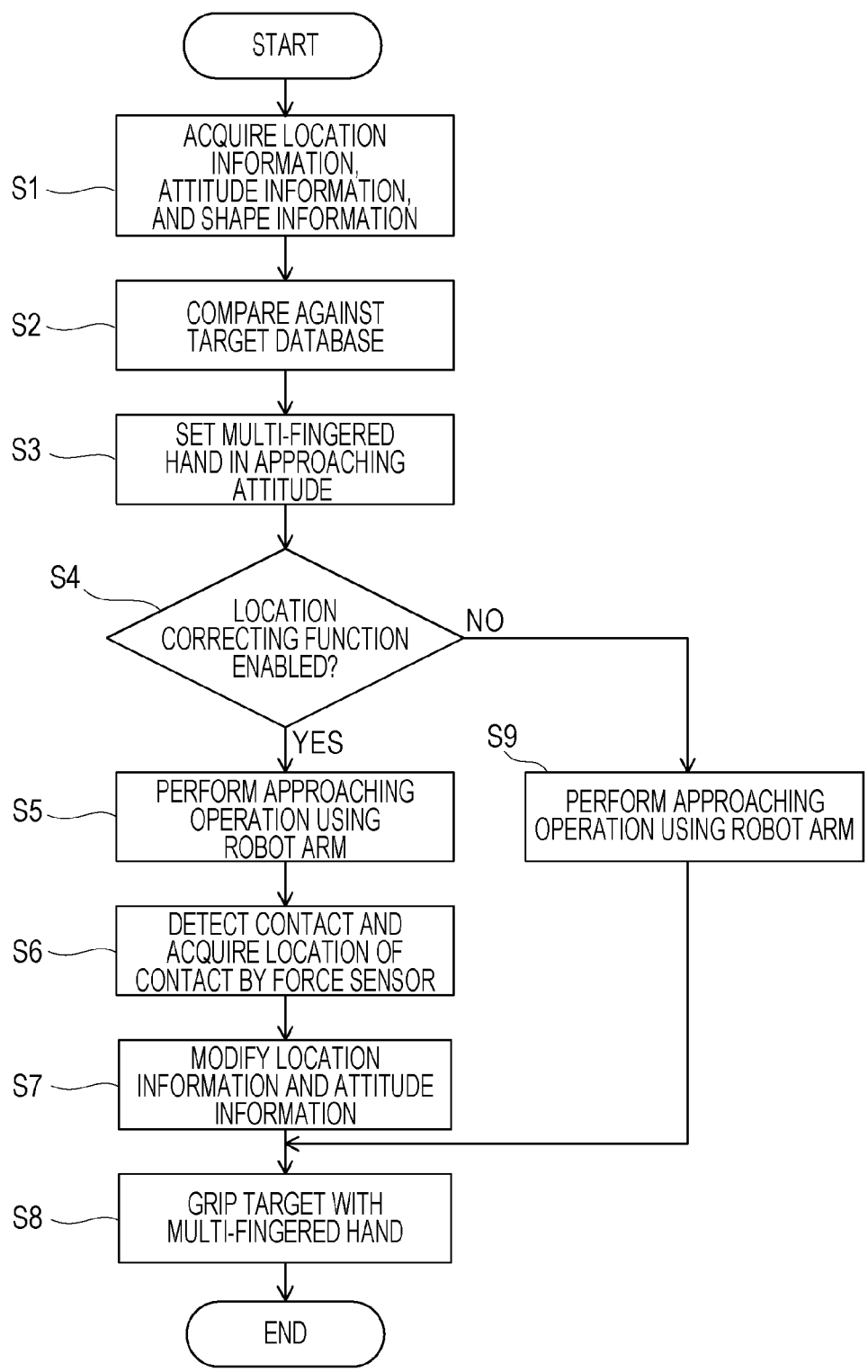
FIG. 2 is a flowchart for describing a process executed by a control device when the robot apparatus illustrated in FIG. 1 according to the first embodiment carries out a gripping operation.

As illustrated in FIG. 2, in step S1, the image processor 43 of the control device 40 acquires the location information, attitude information, and shape information on the gripping target 110 on the basis of data of an image obtained by the visual sensor 30. Next, in step S2, the acquired shape information on the gripping target 110 is compared against data stored in the target database 44 of the control device 40, thus acquiring the dimensional information on the gripping target 110 and gripping manner data (gripping location and gripping attitude) on the gripping target 110 corresponding to the shape information or other data.

In step S3, the arm controller 41 and the hand controller 42 determine a path to the gripping location for the gripping target 110 and an approaching attitude (e.g., a joint angle of each of the fingers 21, 22, and 23 and a space between the fingers) of the multi-fingered hand 20 corresponding to the gripping attitude on the basis of the acquired location information and attitude information on the gripping target 110 and the acquired dimensional information and gripping manner data on the gripping target 110. Then, the fingers 21, 22, and 23 of the multi-fingered hand 20 are arranged so as to take an approaching attitude to the gripping target 110 by driving of the joints (21b to 23b and 21c to 23c) of the fingers 21, 22, and 23.

Next, in step S4, the control device 40 determines whether the location correcting function has been enabled by a user. When it is determined that the location correcting function has been enabled (YES in step S4), processing proceeds to step S5, after which the contact location is detected and the location information (attitude information) is modified. When it is determined that the location correcting function has been disabled (NO in step S4), processing proceeds to step S9.

In step S5, the robot arm 10 is moved by the arm controller 41 of the control device 40 on the basis of the acquired location information and attitude information on the gripping target 110, and an approaching operation of causing the multi-fingered hand 20 to approach the gripping target 110 is started.

When the approaching operation continues, after the multi-fingered hand 20 is arranged in the gripping location, the fingers 21, 22, and 23 are driven such that it approaches the gripping attitude from the approaching attitude. At this time, if the location information on the gripping target 110 contains an error, in the course of moving the multi-fingered hand 20 to the gripping location or in the course of driving the fingers 21, 22, and 23 such that the multi-fingered hand 20 approaches the gripping attitude from the approaching attitude in the gripping location, each of the fingers 21, 22, and 23 of the multi-fingered hand 20 comes into contact with the gripping target 110. In response to this, the force sensors 21a, 22a, and 23a at the ends of the fingers 21, 22, and 23 detect the contact with the gripping target 110. At this time, force control (impedance control) performed on the fingers 21, 22, and 23 by the hand controller 42 of the control device 40 enables a contact operation with a force that does not change the location of the gripping target 110 (with a soft touch). When the contact with the gripping target 110 is detected, the operation of the robot arm 10 and the multi-fingered hand 20 is suspended.

In step S6, the control device 40 (hand controller 42) acquires the location of the contact with the gripping target 110 detected by each of the force sensors 21a, 22a, and 23a (contact location). In this step S6, the actual location of the gripping target 110 (the location in the coordinate system for the robot arm 10 and the multi-fingered hand 20) is acquired. The actual attitude of the gripping target 110 is calculated on the basis of a plurality of (three) contact locations for the gripping target 110.

If the location information on the gripping target 110 acquired in step S1 contains an error, a difference arises between the detected actual contact location and the location indicated by the location information based on the image data. Similarly, if the attitude information on the gripping target 110 acquired in step S1 contains an error, a difference in attitude (orientation) arises between the actual attitude of the gripping target 110 and the attitude indicated by the attitude information based on the image data.

To address this, in step S7, the location information and attitude information on the gripping target 110 is modified on the basis of information indicating the detected three contact locations. With this, the location of the robot arm 10 (i.e., the gripping location of the multi-fingered hand 20) is modified by the arm controller 41 and the gripping attitude of the multi-fingered hand 20 (fingers 21, 22, and 23) is modified by the hand controller 42, on the basis of the modified location information and attitude information on the gripping target 110.

After that, in step S8, in a state where the multi-fingered hand 20 is arranged in the modified gripping location, the fingers 21, 22, and 23 are moved by the hand controller 42 and the multi-fingered hand 20 takes the modified gripping attitude, and the gripping target 110 is thus gripped.

When in step S4 it is determined that the location correcting function has been disabled by a user (NO in step S4), modification of the location based on the actual contact location described above is not made. In step S9 the robot arm 10 is moved by the arm controller 41 on the basis of the location information and attitude information on the gripping target 110 and an approaching operation of causing the multi-fingered hand 20 to approach the gripping target 110 is carried out. When the multi-fingered hand 20 is arranged in the gripping location at the approaching attitude, processing proceeds to step S8, where the fingers 21, 22, and 23 are moved from the approaching attitude to the gripping attitude by the hand controller 42 and the gripping target 110 is gripped.

For the first embodiment, as described above, the provision of the control device 40 configured to move the robot arm 10 to cause the multi-fingered hand 20 to approach the gripping target 110 on the basis of the location information on the gripping target 110, detect the contact location of actual contact with the gripping target 110 on the basis of the output of each of the force sensors 21a, 22a, and 23a of the multi-fingered hand 20, and modify the location information on the gripping target 110 on the basis of the detected contact location enables the location information on the gripping target 110 to be modified on the basis of the contact location at which the multi-fingered hand 20 is actually in contact with the gripping target 110. Therefore, even if the location information on the gripping target 110 acquired by the image processor 43 contains an error, the location information on the gripping target 110 can be modified so as to reduce deviation, and the gripping target 110 can be reliably gripped.

For the first embodiment, as described above, the control device 40 modifies the gripping location of the multi-fingered hand 20 and controls gripping the gripping target 110 by the multi-fingered hand 20 on the basis of the location information modified using the contact location. Thus, even if the location information on the gripping target 110 contains an error, the gripping target 110 can be reliably gripped with the multi-fingered hand 20 in the gripping location modified on the basis of the actual contact location.

For the first embodiment, as described above, the control device 40 moves the robot arm 10 to cause the multi-fingered hand 20 to approach the gripping target 110 on the basis of the location information and attitude information on the gripping target 110 acquired by the image processor 43, detects the contact location of actual contact with the gripping target 110 on the basis of the output of each of the force sensors 21a, 22a, and 23a of the multi-fingered hand 20, and modifies the location information on the gripping target 110 on the basis of information that indicates the detected contact location. Thus, because not only the location information on the gripping target 110 but also the attitude information on the gripping target 110 can be modified on the basis of the information that indicates the detected contact location, the gripping target 110 can be gripped more reliably.

For the first embodiment, as described above, whether the location information is to be modified (the location correcting function is to be performed) is selectable by a user, and if the user selects that the location information is to be modified, the control device 40 detects the contact location of actual contact with the gripping target 110 on the basis of the output of each of the force sensors 21a, 22a, and 23a and modifies the location information on the gripping target 110 on the basis of the information that indicates the detected contact location. Thus, the user can select whether the location information is to be modified, depending on the purpose or usage environment of the robot apparatus 100, and when the user selects that the location information is to be modified, even if the location information on the gripping target 110 contains an error, the gripping target 110 can be reliably gripped.

For the first embodiment, as described above, the control device 40 detects the contact location of actual contact with the gripping target 110 on the basis of the output of each of the three force sensors 21a, 22a, and 23a and modifies the location information on the gripping target 110 on the basis of the information indicating the detected contact location. Thus, a plurality of (three) contact locations of actual contact with the gripping target 110 can be detected by a single contact operation. Accordingly, because information that indicates a plurality of (three) contact locations for the gripping target 110 can be acquired, not only the location information on the gripping target 110 but also the attitude information can be easily modified.

For the first embodiment, as described above, the control device 40 acquires the dimensional information on the gripping target 110 by comparing the shape information on the gripping target 110 acquired by the image processor 43 against information in the target database 44 in which information on the gripping target 110 is stored in advance, moves the robot arm 10 to cause the multi-fingered hand 20 to approach the gripping target 110 on the basis of the dimensional information and location information on the gripping target 110, and detects the contact location of actual contact with the gripping target 110 on the basis of the output of each of the force sensors 21a, 22a, and 23a of the multi-fingered hand 20. Thus, accurate dimensional information on the gripping target 110 can be acquired from the target database 44. Accordingly, the multi-fingered hand 20 (force sensors 21a, 22a, and 23a) can be easily made to come into contact with the gripping target 110 on the basis of the dimensional information and location information on the gripping target 110. Also, because a positional relationship between contact locations for the gripping target 110 can be determined by the use of the dimensional information, the location information on the gripping target 110 can be modified even using a small amount of information that indicates the contact locations.

For the first embodiment, as described above, in a state where the multi-fingered hand 20 is in contact with the gripping target 110 with a force that does not change the location of the gripping target 110 by force control (impedance control) using the force sensors 21a, 22a, and 23a of the multi-fingered hand 20 based on the location information and attitude information on the gripping target 110, the control device 40 detects the contact location of actual contact with the gripping target 110 on the basis of the output of each of the force sensors 21a, 22a, and 23a of the multi-fingered hand 20 and modifies the location information on the gripping target 110 on the basis of the information that indicates the detected contact location. Accordingly, because a change in the location of the gripping target 110 resulting from the contact force between the multi-fingered hand 20 and the gripping target 110 occurring when the multi-fingered hand 20 is made to come into contact with the gripping target 110 can be reduced, the contact location of actual contact with the gripping target 110 can be detected more accurately.

Next, a robot apparatus 200 according to a second embodiment is described with reference to FIGS. 3 and 4. Unlike the above-described first embodiment, in which a user can select whether the location correcting function is to be performed, the second embodiment illustrates an example in which whether the location correcting function is to be performed is determined on the basis of the difference between the location indicated by the location information on the gripping target 110 and the actual contact location.

Figure 3:
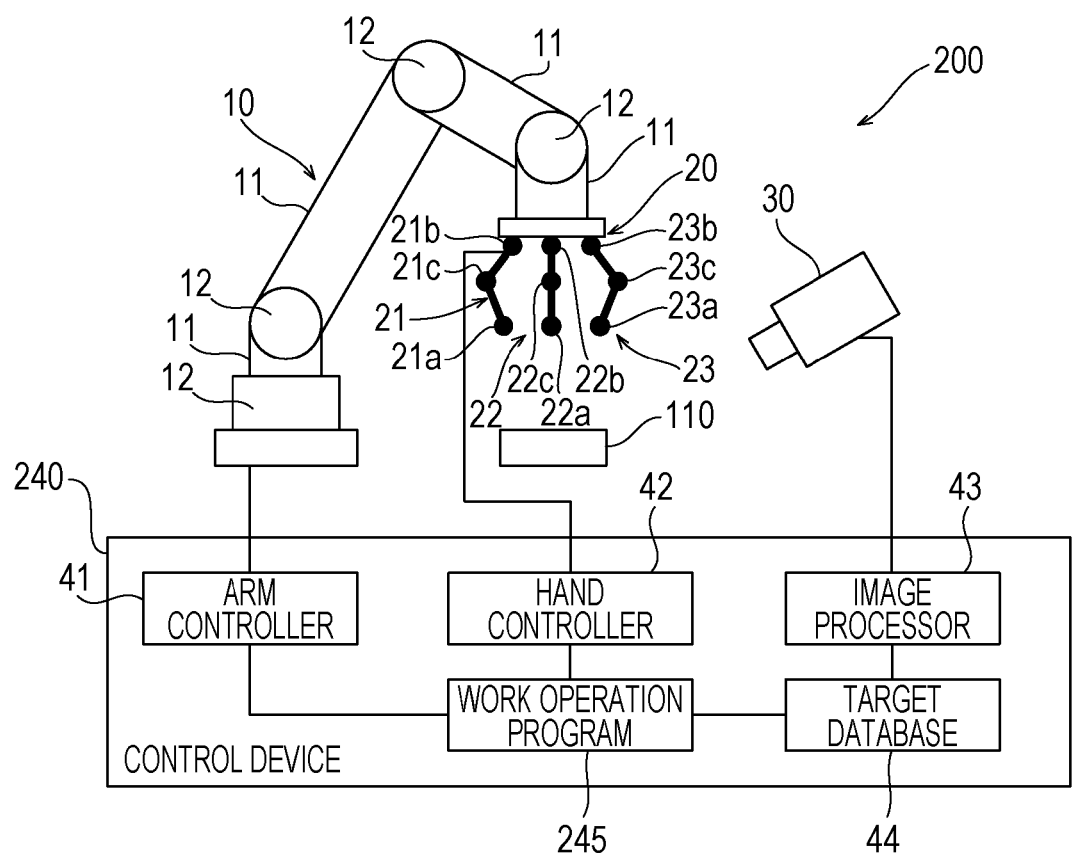
FIG. 3 is a diagram that illustrates a general configuration of a robot apparatus according to a second embodiment.
Figure 4:
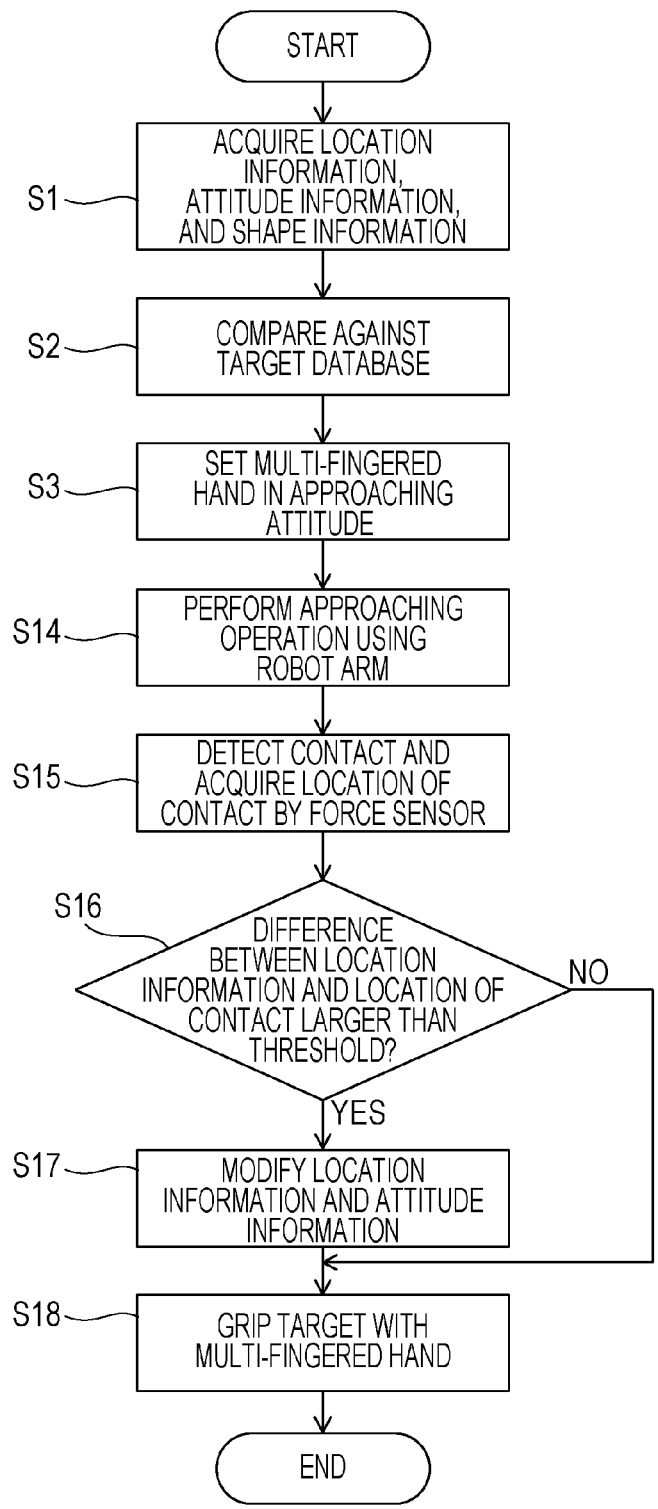
FIG. 4 is a flowchart for describing a process executed by a control device when the robot apparatus illustrated in FIG. 3 according to the second embodiment carries out a gripping operation.

For the second embodiment, as illustrated in FIG. 3, the robot apparatus 200 includes a control device 240. The control device 240 determines whether the difference between the location indicated by the location information on the gripping target 110 acquired on the basis of image data from the visual sensor 30 and the contact location of actual contact with the gripping target 110 detected using each of the force sensors 21a, 22a, and 23a at the ends of the fingers 21, 22, and 23, respectively, is larger than a specific threshold. When the difference between the location indicated by the location information on the gripping target 110 and the actual contact location is larger than the specific threshold, the control device 240 performs the location correcting function of modifying the location information and attitude information on the gripping target 110 on the basis of the information that indicates the contact location. An example of the threshold can be a maximum value of a location difference at which the gripping target 110 can be gripped without modification of the location information and attitude information. The configuration of the arm controller 41, hand controller 42, image processor 43, and target database 44 of the control device 240 is substantially the same as that of the control device 40 in the first embodiment. The second embodiment differs from the above-described first embodiment only in a work operation program 245 of the control device 240. The control device 240 is an example of a controller.

The other configuration of the second embodiment is substantially the same as that of the above-described first embodiment.

Next, a flow of a process executed by the control device 240 when the robot apparatus 200 according to the second embodiment carries out a gripping operation is described with reference to FIGS. 3 and 4. For the second embodiment, the robot apparatus 200 carries out the gripping operation on the basis of the work operation program 245 of the control device 240.

In the flow of the process executed by the control device 240 when the robot apparatus 200 according to the second embodiment carries out the gripping operation, steps S1 to S3 are substantially the same as those in the above-described first embodiment. That is, as illustrated in FIG. 4, in step S1, the image processor 43 of the control device 240 acquires the location information, attitude information, and shape information on the gripping target 110 on the basis of data of an image obtained by the visual sensor 30. Next, in step S2, the acquired shape information on the gripping target 110 is compared against data stored in the target database 44 of the control device 240, thus acquiring the dimensional information and gripping manner data on the gripping target 110 or other data. In step S3, the fingers 21, 22, and 23 of the multi-fingered hand 20 are arranged so as to take an approaching attitude to the gripping target 110 on the basis of the acquired location information and attitude information on the gripping target 110 and the dimensional information and gripping manner information on the gripping target 110.

After step S3, for the second embodiment, in step S14, the robot arm 10 is moved by the arm controller 41 on the basis of the acquired location information and attitude information on the gripping target 110 to cause the multi-fingered hand 20 to approach the gripping target 110, and an approaching operation of causing the multi-fingered hand 20 arranged in the gripping location to come into contact with the gripping target 110 is carried out.

As the approaching operation proceeds, contact with the gripping target 110 is detected by each of the force sensors 21a, 22a, and 23a at the ends of the fingers 21, 22, and 23, and the operation of the robot arm 10 and the multi-fingered hand 20 is suspended. At this time, force control (impedance control) performed on the fingers 21, 22, and 23 by the hand controller 42 on the basis of the output of each of the force sensors 21a, 22a, and 23a enables a contact operation with a force that does not change the location of the gripping target 110 (with a soft touch). In step S15, the location of contact with the gripping target 110 detected by each of the force sensors 21a, 22a, and 23a (contact location) is acquired by the control device 240 (hand controller 42). In this step S15, the actual location and attitude of the gripping target 110 (location and attitude in the coordinate system for the robot arm 10 and the multi-fingered hand 20) is acquired.

Here, for the second embodiment, in step S16, the control device 240 determines whether the difference between the location indicated by the location information on the gripping target 110 acquired in step S1 and the contact location of actual contact with the gripping target 110 detected in step S15 is larger than a specific threshold. When the difference between the location indicated by the location information on the gripping target 110 and the actual contact location is larger than the specific threshold (YES in step S16), processing proceeds to step S17, where the location information and attitude information is modified (the gripping location and gripping attitude of the multi-fingered hand 20 is modified). In contrast, when the difference between the location indicated by the location information on the gripping target 110 and the actual contact location is at or below the specific threshold (NO in step S16), it is determined that gripping is possible without modification of the gripping location and gripping attitude, and processing proceeds to step S18.

In step S17, the hand controller 42 of the control device 240 modifies the location information and attitude information on the gripping target 110 on the basis of information that indicates the detected plurality of contact locations. With this, the location of the robot arm 10 (i.e., the gripping location of the multi-fingered hand 20) is modified by the arm controller 41 on the basis of the modified location information and attitude information on the gripping target 110, and the gripping attitude of the multi-fingered hand 20 (fingers 21, 22, and 23) is modified by the hand controller 42.

In step S18, in a state where the multi-fingered hand 20 is arranged in the modified gripping location, the hand controller 42 of the control device 240 moves the fingers 21, 22, and 23 to cause the multi-fingered hand 20 to take the modified gripping attitude, thus gripping the gripping target 110 with the multi-fingered hand 20. When it is determined in step S16 that the difference between the location indicated by the location information on the gripping target 110 and the actual contact location is at or below the specific threshold (NO in step S16), processing proceeds to step S18, and the gripping operation is carried out without modification of the gripping location and gripping attitude of the multi-fingered hand 20.

For the second embodiment, as described above, the control device 240 detects the contact location of actual contact with the gripping target 110 on the basis of the output of each of the force sensors 21a, 22a, and 23a, and when the difference between the location indicated by the location information on the gripping target 110 and the detected actual contact location for the gripping target 110 is larger than a specific threshold, the control device 240 modifies the location information on the gripping target 110 on the basis of the information that indicates the detected contact location. Accordingly, when the control device 240 determines that the location information on the gripping target 110 acquired by the image processor 43 contains deviation (error) from the actual contact location larger than a specific threshold, the location information on the gripping target 110 can be modified on the basis of the information that indicates the detected contact location. Thus, only when the difference between the location information on the gripping target 110 acquired by the image processor 43 and the location information that indicates the actual location of the gripping target 110 is so large that stable gripping is difficult (when that difference is larger than a threshold), the location information on the gripping target 110 can be modified on the basis of the information that indicates the detected contact location. As a result, a control load of the control device 240 can be reduced.

The other advantages of the second embodiment are substantially the same as those of the above-described first embodiment.

Next, a robot apparatus 300 according to a third embodiment is described with reference to FIGS. 5 to 7. Unlike the above-described first and second embodiments, the third embodiment illustrates an example in which the robot apparatus 300 includes a vehicle 350 for moving the robot arm 10 and the multi-fingered hand 20.

Figure 5:
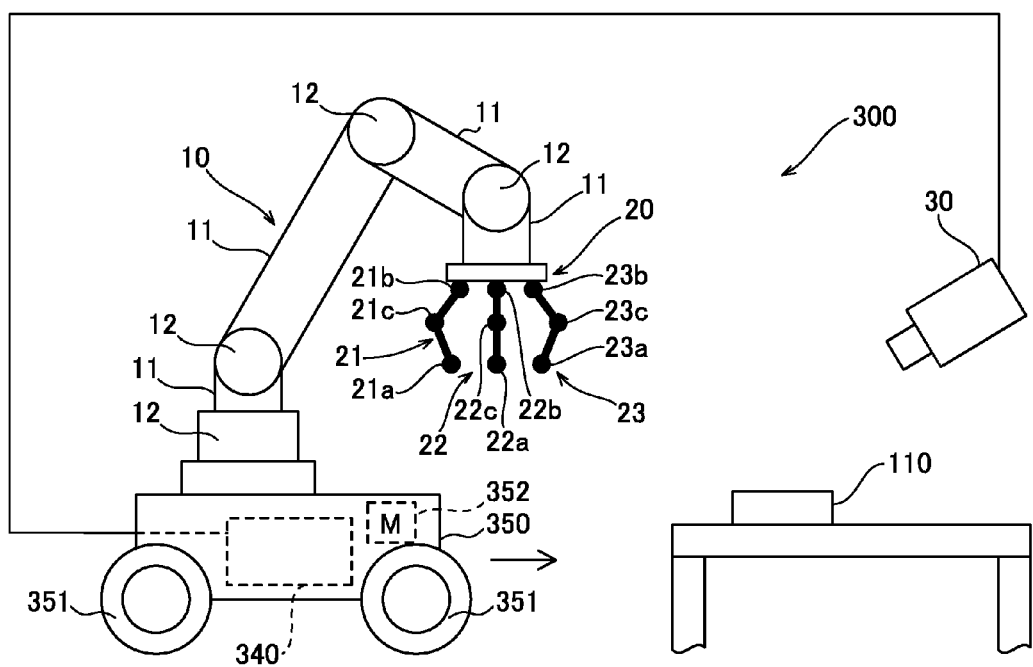
FIG. 5 is a diagram that illustrates a general configuration of a robot apparatus according to a third embodiment.

For the third embodiment, as illustrated in FIG. 5, the robot apparatus 300 includes the robot arm 10, multi-fingered hand 20, visual sensor 30, a control device 340, and the vehicle 350. For the third embodiment, the robot arm 10 and the multi-fingered hand 20 at the end of the robot arm 10 are placed on the vehicle 350, and the control device 340 is incorporated in the vehicle 350. In response to an instruction to grip (and move) the gripping target 110 from a user, the robot apparatus 300 moves the vehicle 350 toward the gripping target 110 to grip the gripping target 110. The control device 340 is an example of a controller. The configuration of the robot arm 10, multi-fingered hand 20, and visual sensor 30 of the third embodiment is substantially the same as that of the above-described first and second embodiments.

The vehicle 350 includes four wheels 351, for example, and incorporates a motor 352 for driving the wheels 351. The vehicle 350 is movable to any location by driving of the motor 352 for the wheels 351 on the basis of a control signal input from the control device 340.

Figure 6:
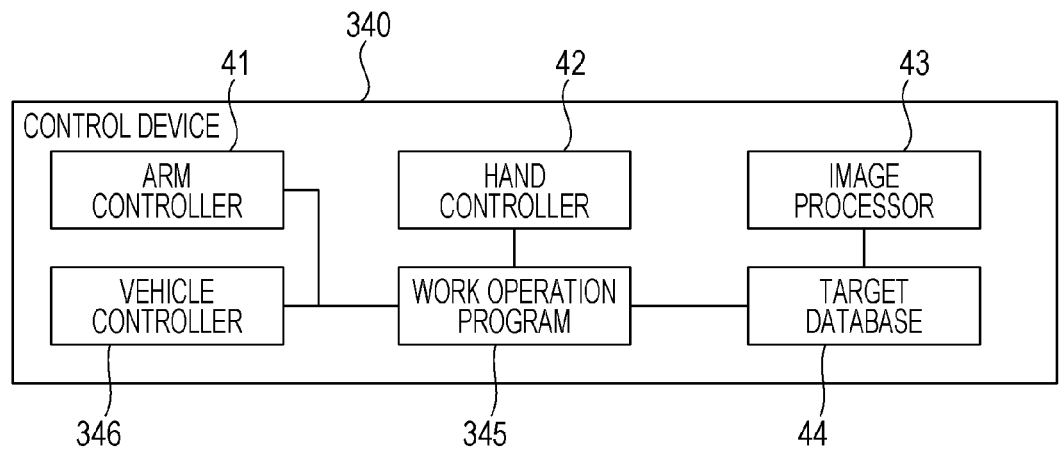
FIG. 6 is a block diagram that illustrates a configuration of a control device of the robot apparatus illustrated in FIG. 5 according to the third embodiment.

As illustrated in FIG. 6, the control device 340 includes the arm controller 41, hand controller 42, image processor 43, target database 44, a work operation program 345, and a vehicle controller 346. The configuration of the arm controller 41, hand controller 42, image processor 43, and target database 44 of the control device 340 is substantially the same as that of the control device 40 in the above-described first embodiment. The third embodiment differs from the first embodiment in the work operation program 345 and vehicle controller 346 of the control device 340.

The vehicle controller 346 has the function of controlling motion of the vehicle 350 by outputting a control signal to the motor 352 of the vehicle 350. In an operation of gripping the gripping target 110, the vehicle controller 346 moves the vehicle 350 toward the gripping target 110 on the basis of the location information and attitude information on the gripping target 110 acquired on the basis of image data from the visual sensor 30.

For the third embodiment, the control device 340 performs the location correcting function when the movement of the vehicle 350 in an operation of gripping the gripping target 110 is larger than a specific threshold. That is, as described above, the difference between the location indicated by the location information on the gripping target 110 and the actual contact location typically arises when calibration is insufficient or when the positional relationship between the visual sensor 30 and each of the robot arm 10 and multi-fingered hand 20 varies. For the third embodiment, because the cases where the movement of the vehicle 350 is larger than a specific threshold may include a situation in which the positional relationship between the visual sensor 30 and each of the robot arm 10 and multi-fingered hand 20 varies and a situation in which the difference in location and orientation is caused by moving of the vehicle 350, there is a high possibility that a difference between the location indicated by the location information on the gripping target 110 and the actual contact location will arise. In contrast, when the movement of the vehicle 350 is small, because the positional relationship remains virtually unchanged, the control device 340 can determine that it is not necessary to perform the location correcting function.

For the third embodiment, even when the movement of the vehicle 350 is at or below the specific threshold, if the difference between the location indicated by the location information on the gripping target 110 acquired on the basis of image data from the visual sensor 30 and the contact location of actual contact with the gripping target 110 detected using the force sensors 21a, 22a, and 23a at the ends of the fingers 21, 22, and 23 is larger than a specific threshold, the control device 340 performs the location correcting function. The details of the location correcting function are substantially the same as those in the above-described first and second embodiments; the control device 340 (hand controller 42) acquires a plurality of (three) contact locations of the gripping target 110 on the basis of the output of each of the force sensors 21a, 22a, and 23a and modifies the location information and attitude information on the gripping target 110 on the basis of the information that indicates the plurality of (three) contact locations.

The other configuration of the third embodiment is substantially the same as that of the above-described first and second embodiments.

Next, a flow of a process executed by the control device 340 when the robot apparatus 300 according to the third embodiment carries out a gripping operation is described with reference to FIG. 7. For the third embodiment, the robot apparatus 300 carries out the gripping operation on the basis of the work operation program 345 of the control device 340.

In the flow of the process executed by the control device 340 when the robot apparatus 300 according to the third embodiment carries out the gripping operation, steps S1 and S2 are substantially the same as those in the above-described first embodiment. That is, as illustrated in FIG. 7, in step S1, the image processor 43 of the control device 340 acquires the location information, attitude information, and shape information on the gripping target 110 on the basis of data of an image obtained by the visual sensor 30. Next, in step S2, the acquired shape information on the gripping target 110 is compared against data stored in the target database 44 of the control device 340, thus acquiring the dimensional information and gripping manner data (gripping location and gripping attitude) on the gripping target 110 corresponding to the shape information or other data.

Next, in step S23, the vehicle 350 is moved toward the gripping target 110 by the vehicle controller 346 driving the motor 352 of the vehicle 350. Specifically, first, a path to the gripping location for the gripping target 110 and an approaching attitude of the multi-fingered hand 20 corresponding to the gripping attitude are determined by the arm controller 41, hand controller 42, and vehicle controller 346 on the basis of the acquired location information and attitude information on the gripping target 110 and the dimensional information and gripping manner data on the gripping target 110. Then, the vehicle 350 is moved to a location where the multi-fingered hand 20 can be arranged in the gripping location by the vehicle controller 346 on the basis of the path to the gripping location for the gripping target 110. At this time, the distance traveled by the vehicle 350 is acquired by the vehicle controller 346.

Next, in step S24, the fingers 21, 22, and 23 of the multi-fingered hand 20 are arranged so as to take the approaching attitude to the gripping target 110 by the hand controller 42 of the control device 340 on the basis of the gripping location and gripping attitude on the gripping target 110.

Here, for the third embodiment, in step S25, the control device 340 determines whether the movement of the vehicle 350 in step S23 is larger than a specific threshold. When the movement is larger than the specific threshold (YES in step S25), it is determined that the location correcting function is to be performed and processing proceeds to step S26. In contrast, when the movement of the vehicle 350 is at or below the specific threshold (NO in step S25), it is determined at the point of step S25 that the location correcting function is not to be performed and processing proceeds to step S30.

Next, in step S26, the robot arm 10 is moved by the arm controller 41 of the control device 340 on the basis of the acquired location information and attitude information on the gripping target 110, and an approaching operation of causing the multi-fingered hand 20 to approach the gripping target 110 is carried out.

As the approaching operation proceeds, contact with the gripping target 110 is detected by each of the force sensors 21a, 22a, and 23a of the multi-fingered hand 20 and the operation of the robot arm 10 and the multi-fingered hand 20 is suspended. At this time, force control (impedance control) performed on the fingers 21, 22, and 23 by the hand controller 42 of the control device 340 on the basis of the output of each of the force sensors 21a, 22a, and 23a enables a contact operation with a force that does not change the location of the gripping target 110. In step S27, the location of contact with the gripping target 110 detected by each of the force sensors 21a, 22a, and 23a (contact location) is acquired by the control device 340 (hand controller 42). In this step S27, the actual location and attitude of the gripping target 110 (location and attitude in the coordinate system for the robot arm 10 and the multi-fingered hand 20) is acquired.

In step S28, the location information and attitude information on the gripping target 110 is modified by the hand controller 42 of the control device 340 on the basis of the information that indicates the detected plurality of (three) contact locations. With this, the location of the robot arm 10 (i.e., the gripping location of the multi-fingered hand 20) is modified by the arm controller 41 and the gripping attitude of the multi-fingered hand 20 (fingers 21, 22, and 23) is modified by the hand controller 42, on the basis of the modified location information and attitude information on the gripping target 110.

In step S29, in a state where the multi-fingered hand 20 is arranged in the modified gripping location, the multi-fingered hand 20 is made to take the modified gripping attitude by the hand controller 42, thus gripping the gripping target 110.

In contrast, when it is determined in step S25 that the movement of the robot apparatus 300 (vehicle 350) is at or below the specific threshold (NO in step S25), processing proceeds to step S30. In step S30, the robot arm 10 is moved by the arm controller 41 on the basis of the location information and attitude information on the gripping target 110, and an approaching operation of arranging the multi-fingered hand 20 in the gripping location for the gripping target 110 is carried out.

In step S31, the fingers 21, 22, and 23 are moved by the hand controller 42, and the operation of gripping the gripping target 110 by the multi-fingered hand 20 is started. At this time, contact with the gripping target 110 is detected by each of the force sensors 21a, 22a, and 23a of the multi-fingered hand 20, and the location at which the contact has been detected (contact location) is acquired by the control device 340 (hand controller 42). Accordingly, in this step S31, the actual location and attitude of the gripping target 110 (location and attitude in the coordinate system for the robot arm 10 and the multi-fingered hand 20) is acquired in the course of the gripping operation.

For the third embodiment, in step S32, unlike step S25, the control device 340 determines whether the difference between the location indicated by the location information on the gripping target 110 acquired in step S1 and the contact location of actual contact with the gripping target 110 in step S31 is larger than a specific threshold to determine whether the location correcting function is to be performed. That is, in step S25 whether the location correcting function is to be performed is determined on the basis of the movement of the vehicle 350, but even if the movement of the vehicle 350 is small, a difference between the location indicated by the location information and the actual contact location may arise. In consideration of this situation, for the third embodiment, in step S32, when the difference between the location indicated by the location information on the gripping target 110 and the actual contact location is larger than the specific threshold (YES in step S32), processing proceeds to step S33, where the gripping operation is suspended and the gripping location and gripping attitude of the multi-fingered hand 20 is modified. In contrast, when the difference between the location indicated by the location information on the gripping target 110 and the actual contact location is at or below the specific threshold (NO in step S32), the gripping operation continues without the performance of the location correcting function, the multi-fingered hand 20 takes the gripping attitude, and thus the gripping of the gripping target 110 is completed.

In step S33, as in the case of step S28, the location information and attitude information on the gripping target 110 is modified by the hand controller 42 on the basis of the information that indicates the detected plurality of (three) contact locations. With this, the location of the robot arm 10 (i.e., the gripping location of the multi-fingered hand 20) is modified by the arm controller 41 and the gripping attitude of the multi-fingered hand 20 (fingers 21, 22, and 23) is modified by the hand controller 42, on the basis of the modified location information and attitude information on the gripping target 110. After that, in step S29, the fingers 21, 22, and 23 are driven by the hand controller 42, and the multi-fingered hand 20 takes the modified gripping attitude, thus gripping the gripping target 110.

For the third embodiment, as described above, the vehicle 350 for moving the robot arm 10 having an end on which the multi-fingered hand 20 is disposed toward the gripping target 110 is provided, the vehicle 350 and the robot arm 10 are moved on the basis of the location information and attitude information on the gripping target 110 acquired by the image processor 43 to cause the multi-fingered hand 20 to approach the gripping target 110, the contact location of actual contact with the gripping target 110 is detected on the basis of the output of each of the force sensors 21a, 22a, and 23a of the multi-fingered hand 20, and the location information on the gripping target 110 is modified on the basis of the information that indicates the detected contact location. Thus, even if the location information on the gripping target 110 acquired by the image processor 43 is likely to contain an error resulting from a change in the location of the robot apparatus 300 itself, the contact location at which the multi-fingered hand 20 is actually in contact with the gripping target 110 can be detected, and the location information on the gripping target 110 can be modified on the basis of information that indicates the detected contact location. Accordingly, the gripping target 110 can be reliably gripped.

The other advantages of the third embodiment are substantially the same as those of the above-described second embodiment.

The disclosed embodiments are merely examples in all respects and are not intended to be limiting.

For example, the above-described first to third embodiments illustrate an example applied to the robot apparatus 100 (200, 300) used as a life support robot. However, the present invention is not limited to that example. The robot apparatus can also be used as one other than a life support robot as long as it includes a robot arm and a multi-fingered hand. For example, the robot apparatus is also applicable to various kinds of industrial robot apparatuses.

The above-described first to third embodiments illustrate an example in which a visual sensor (camera) is provided as an example of a detection unit and an image processor is provided as an example of an information acquiring unit. However, the present invention is not limited to that example. For example, a device other than a visual sensor (camera), such as an input device (e.g., a keyboard), may be used to input location information on a gripping target by a user. Alternatively, a visual sensor, an image processor, and a touch panel may be used in combination to allow a user to select a gripping target on the screen of the touch panel. Alternatively, any sensor other than a visual sensor, such as a range sensor may be used to acquire location information on a target. Alternatively, pressure sensors arranged in an array may be used so as to allow location information on a target placed on the pressure sensors (array) to be acquired.

The above-described first to third embodiments illustrate an example in which location information on a gripping target is modified on the basis of information that indicates a detected contact location and the gripping target is gripped with a multi-fingered hand on the basis of the modified location information. However, the present invention is not limited to that example. For example, any operation other than gripping may be controlled on the basis of the modified location information. Specifically, an object may be stored in or liquid may be poured into a target as a container on the basis of the modified location information.

The above-described first to third embodiments illustrate an example in which a robot apparatus includes a single robot arm and a single multi-fingered hand. However, the present invention is not limited to that example. For example, a robot apparatus may include a plurality of robot arms and a plurality of multi-fingered hands. Alternatively, a robot apparatus may include a plurality of multi-fingered hands for a single robot arm.

The above-described first to third embodiments illustrate an example in which a six-degree-of-freedom robot arm is provided. However, the present invention is not limited to that example. A robot arm of other degrees of freedom may also be used. Similarly, the shape of a robot arm and the location of a joint of the robot arm may be different from those illustrated in the above-described first to third embodiments.

The above-described first to third embodiments illustrate an example in which a six-degree-of-freedom multi-fingered hand that includes three fingers each having two degrees of freedom. However, the number of fingers of a multi-fingered hand and the number of degrees of freedom of the fingers are not limited to the above numbers. For example, a multi-fingered hand may include two fingers, or alternatively, it may include four or more fingers. A finger may have one degree of freedom, or alternatively, it may have three or more degrees of freedom. A multi-fingered hand may have a shape different from one illustrated in the above-described first to third embodiments. A joint of a finger of a multi-fingered hand may be positioned in a location different from one illustrated in the above-described first to third embodiments.

The above-described first to third embodiments illustrate an example in which each of three fingers of a multi-fingered hand includes a fingertip force sensor. However, the present invention is not limited to that example. Any configuration may be used as long as at least one finger includes a fingertip force sensor.

The above-described first to third embodiments illustrate an example in which the force sensors 21a, 22a, and 23a being an example of a fingertip force sensor is a pressure sensor for detecting forces in three axes. However, the present invention is not limited to that example. For example, a fingertip force sensor may be a sensor for detecting forces in a number of axes other than three, such as in six axes.

In the description of an operation of a robot apparatus according to the above-described first to third embodiments, an example in which the contact location of actual contact with a gripping target is detected and the location information and attitude information on the gripping target is modified on the basis of the detected contact location is described. However, the present invention is not limited to that example. The actual contact location of an object other than the gripping target may be detected as a target. That is, if the gripping target 110 is placed on the top of a table (see FIG. 5), first causing the fingers 21, 22, and 23 of the multi-fingered hand 20 to come into contact with the table and then detecting the contact location with respect to the table allows the location information indicating the height location of the gripping target 110 (location information in the z-axis direction) to be modified. When the table is substantially level, because the inclination (attitude) about each of the x-axis and y-axis of the gripping target 110 on the table is also substantially level, detection of (three) contact locations with respect to the table allows the attitude information on the gripping target 110 to be modified as well. Accordingly, when the gripping target is recognized as being placed on a table or a rack on the basis of image data from the visual sensor (when the positional relationship between the gripping target and another object is clear), detection of contact locations using the table or rack as a target enables a reduction in the number of pieces of information required to be actually acquired from the gripping target (for modification of location information and attitude information, the number of contact locations for identifying three degrees of freedom for each, i.e., six degrees of freedom in total).

In gripping, depending on the shape of a gripping target, identifying the location and attitude of six degrees of freedom is often unnecessary. For example, in the case of a columnar gripping target, because it is not necessary to take the attitude about the z-axis into account, only location information may be acquired and the location information may be modified on the actual contact location to grip the gripping target.

The first embodiment illustrates an example in which whether the location correcting function of modifying the location information on the gripping target on the basis of the detected contact location is to be performed is determined on the basis of selection made by a user on the control device 40, the second embodiment illustrates an example in which such determination is made on the basis of the magnitude of the difference between the location indicated by the location information and the actual contact location, and the third embodiment illustrates an example in which such determination is made on the basis of the movement of the vehicle 350 and the magnitude of the difference between the location indicated by the location information and the detected contact location. However, the present invention is not limited to these examples. That is, whether the location correcting function of modifying the location information on the gripping target on the basis of the detected contact location is to be performed may be determined on the basis of a determination criterion other than the above-described examples.

The above-described first to third embodiments illustrate an example in which the location information and attitude information on the gripping target is modified on the basis of the detected contact location. However, the present invention is not limited to that example. For example, only the location information on the gripping target may be modified on the basis of the detected contact location.

The above-described first to third embodiments illustrate an example in which the multi-fingered hand 20 (fingers 21, 22, and 23) is made to come into contact with the gripping target 110 with a force that does not change the location of the gripping target 110 (with a soft touch) by impedance control employed as force control used in the operation of gripping the gripping target 110. The present invention is not limited to that example. Force control other than impedance control may be employed in causing the multi-fingered hand to come into contact with the gripping target with a force that does not change the location of the gripping target (with a soft touch). Alternatively, no force control may be employed in causing the multi-fingered hand to come into contact with the gripping target.

The above-described first to third embodiments illustrate an example in which the shape information on the target acquired by the image processor 43 is compared against data in the target database 44 and the dimensional information on the gripping target 110 is acquired. However, the present invention is not limited to that example. Alternatively, an approaching operation to the gripping target may be carried out on the basis of the location information and attitude information on the gripping target acquired by the image processor 43 without acquiring the dimensional information.

The above-described first to third embodiments illustrate an example in which a control device contains a target database. However, the present invention is not limited to that example. The target database may be provided to an external server, and the control device may access the external server and acquire information in the target database, such as the dimensional information and gripping manner data on the gripping target.

The third embodiment illustrates an example in which the robot apparatus 300 includes the four-wheel vehicle 350 in which the control device 340 is incorporated. However, the present invention is not limited to that example. The vehicle does not have to have four wheels, and the control device does not have to be incorporated in the vehicle. For example, the vehicle may have three wheels, may be of a crawler (trackless) type, or alternatively, may move on a track, such as a rail. The control device may be disposed inside or outside the vehicle.

What is claimed as new and is desired to be secured by Letters Patent of the United States is:

1. A robot apparatus comprising:
    a robot arm;
    a multi-fingered hand disposed at an end of the robot arm and including at least one fingertip force sensor for use in force control;
    an information acquiring unit that acquires at least location information on a target by an input from a user or by detection made by a detection unit; and
    a controller that moves the robot arm to cause the multi-fingered hand to approach the target on the basis of the at least location information on the target acquired by the information acquiring unit, detects a contact location at which actual contact is made between the at least one fingertip force sensor and the target on the basis of an output of the at least one fingertip force sensor of the multi-fingered hand, and modifies the location information on the target on the basis of information indicating the contact location,
    wherein when a difference between a location indicated by the location information on the target acquired by the information acquiring unit and the contact location is larger than a specific threshold, the controller modifies the location information on the target on the basis of the information indicating the contact location.

2. The robot apparatus according to claim 1, wherein the controller modifies a gripping position of the multi-fingered hand on the basis of the modified location information and performs control for gripping the target with the multi-fingered hand, wherein the gripping position is a location and attitude at which the multi-fingered hand is positioned to grip the target.

3. The robot apparatus according to claim 1, wherein the information acquiring unit acquires attitude information on the target, in addition to the location information on the target, by the input from the user or by the detection made by the detection unit, and
    the controller moves the robot arm on the basis of the location information and the attitude information on the target acquired by the information acquiring unit to cause the multi- fingered hand to approach the target, detects the contact location on the basis of the output of the at least one fingertip force sensor of the multi-fingered hand, and modifies the location information and the attitude information on the target on the basis of the information indicating the detected contact location.

4. The robot apparatus according to claim 1, wherein whether the location information is to be modified is selectable by the user, and
    when the user selects that the location information is to be modified, the controller detects the contact location on the basis of the output of the at least one fingertip force sensor and modifies the location information on the target on the basis of the information indicating the contact location.

5. The robot apparatus according to claim 1, wherein the at least one fingertip force sensor comprises a plurality of fingertip force sensors disposed at fingertips of the multi-fingered hand, and
    the controller detects the contact locations on the basis of the output of the plurality of fingertip force sensors and modifies the location information on the target on the basis of the information indicating the contact locations.

6. The robot apparatus according to claim 1, wherein the information acquiring unit acquires the location information and shape information on the target by the input from the user or the detection made by the detection unit, and the controller compares the shape information on the target acquired by the information acquiring unit against information in a database in which information on the target is stored in advance to acquire dimensional information on the target, moves the robot arm on the basis of the dimensional information and the location information on the target to cause the multi-fingered hand to approach the target, and detects the contact location on the basis of the output of the at least one fingertip force sensor of the multi-fingered hand.

7. The robot apparatus according to claim 1, wherein in a state where the multi-fingered hand is in contact with the target with a force that does not change the location of the target under the force control using the at least one fingertip force sensor of the multi-fingered hand based on the at least location information on the target, the controller detects the contact location on the basis of the output of the at least one fingertip force sensor of the multi-fingered hand and modifies the location information on the target on the basis of the information indicating the contact location.

8. The robot apparatus according to claim 1, further comprising a vehicle for moving the robot arm having an end on which the multi-fingered hand is disposed toward the target,
wherein the vehicle and the robot arm are moved to cause the multi-fingered hand to approach the target on the basis of the at least location information on the target acquired by the information acquiring unit, detects the contact location on the basis of the output of the at least one fingertip force sensor of the multi-fingered hand, and modifies the location information on the target on the basis of the information indicating the contact location.

9. A gripping method for use in a robot apparatus including a robot arm having an end on which a multi-fingered hand including a fingertip force sensor is disposed, the gripping method comprising the steps of:
acquiring at least location information on a target;
moving the robot arm on the basis of the at least acquired location information on the target to cause the multi-fingered hand at the end of the robot arm to approach the target and detecting a contact location at which actual contact is made between the at least one fingertip force sensor and the target on the basis of an output of the fingertip force sensor of the multi-fingered hand; and
modifying, using a controller, the location information on the target on the basis of information indicating the contact location,
wherein when a difference between a location indicated by the location information on the target acquired by the information acquiring unit and the contact location is larger than a specific threshold, the controller modifies the location information on the target on the basis of the information indicating the contact location.

10. The gripping method according to claim 9, further comprising:
moving a vehicle for moving the robot arm having an end on which the multi-fingered hand is disposed from a first position to a second position adjacent to the target,
wherein when a distance of movement of the vehicle from the first position to the second position is larger than a threshold amount, the controller modifies the location information on the target on the basis of the information indicating the contact location.

11. A robot apparatus comprising:
a robot arm;
a multi-fingered hand disposed at an end of the robot arm and including at least one fingertip force sensor for use in force control;
an information acquiring unit that acquires at least location information on a target by an input from a user or by detection made by a detection unit;
a controller that moves the robot arm to cause the multi-fingered hand to approach the target on the basis of the at least location information on the target acquired by the information acquiring unit, detects a contact location at which actual contact is made between the at least one fingertip force sensor and the target on the basis of an output of the at least one fingertip force sensor of the multi-fingered hand, and modifies the location information on the target on the basis of information indicating the contact location; and
a vehicle for moving the robot arm having an end on which the multi-fingered hand is disposed from a first position to a second position adjacent to the target,
wherein when a distance of movement of the vehicle from the first position to the second position is larger than a threshold amount, the controller modifies the location information on the target on the basis of the information indicating the contact location.

* * * * *